United States Patent
Ogawa

(10) Patent No.: US 10,622,125 B1
(45) Date of Patent: Apr. 14, 2020

(54) STRAIN GAUGE

(71) Applicant: NMB Technologies Corporation, Novi, MI (US)

(72) Inventor: Satoshi Ogawa, Sunnyvale, CA (US)

(73) Assignee: NMB Technologies Corporation MI (US)

(*) Notice: Subject to any disclaimer, the term of this patent is extended or adjusted under 35 U.S.C. 154(b) by 0 days.

(21) Appl. No.: 16/295,454

(22) Filed: Mar. 7, 2019

(51) Int. Cl.
*H01C 17/24* (2006.01)
*G01L 1/22* (2006.01)
*H01C 1/012* (2006.01)
*H01C 1/14* (2006.01)

(52) U.S. Cl.
CPC ............ *H01C 17/24* (2013.01); *G01L 1/2287* (2013.01); *H01C 1/012* (2013.01); *H01C 1/14* (2013.01)

(58) Field of Classification Search
CPC . H01C 3/10; H01C 3/12; H01C 17/24; H01C 17/242; G01L 11/2287
See application file for complete search history.

(56) References Cited

U.S. PATENT DOCUMENTS

| | | | | | |
|---|---|---|---|---|---|
| 2,953,764 | A | * | 9/1960 | Tellkamp | H01C 1/032 338/309 |
| 4,146,867 | A | * | 3/1979 | Blangeard | H01C 7/22 338/195 |
| 4,146,957 | A | * | 4/1979 | Toenshoff | G01K 7/183 29/612 |
| 4,242,660 | A | * | 12/1980 | Cocca | H01C 7/22 338/195 |
| 4,342,217 | A | * | 8/1982 | Paetow | G01L 1/2287 338/2 |
| 4,432,247 | A | * | 2/1984 | Takeno | G01L 1/2206 338/2 |
| 4,777,826 | A | * | 10/1988 | Rud, Jr. | G01L 1/2281 338/195 |
| 9,793,033 | B2 | * | 10/2017 | Fukao | H01C 3/10 |
| 10,209,150 | B2 | * | 2/2019 | Inamori | G01B 7/18 |
| 2012/0247220 | A1 | * | 10/2012 | Inamori | G01B 7/18 73/766 |
| 2015/0338294 | A1 | | 11/2015 | Watson et al. | |
| 2018/0113034 | A1 | | 4/2018 | Inamori | |

FOREIGN PATENT DOCUMENTS

| | | |
|---|---|---|
| JP | 2016-507742 | 3/2016 |
| JP | 2018-66703 | 4/2018 |

* cited by examiner

*Primary Examiner* — Kyung S Lee
(74) *Attorney, Agent, or Firm* — IPUSA, PLLC

(57) ABSTRACT

A strain gauge includes a substrate having a surface, a resistor pattern provided on the surface of the substrate, and an adjusting part. The resistor pattern has a pair of terminals, and grid lines coupled to each other in series and forming a zigzag pattern coupled between the pair of terminals. The adjusting part is provided on the zigzag pattern, and includes trim resistors coupled in parallel to one of the grid lines. The trim resistors are arranged at intervals along a direction in which the one of the grid lines of the zigzag pattern extends, and have mutually different lengths along the one of the grid lines of the zigzag pattern.

20 Claims, 4 Drawing Sheets

STRAIN GAUGE

BACKGROUND OF THE INVENTION

1. Field of the Invention

The embodiments discussed herein relate to a strain gauge.

2. Description of the Related Art

An example of a strain gauge includes a zigzag resistor pattern provided on a substrate surface. Trim resistors may be connected to grid resistors of the zigzag resistor pattern, so that an electrical resistance of the zigzag resistor pattern is adjustable by trimming one or more trim resistors.

However, the trim resistors used in the conventional strain gauges have a constant electrical resistance. For this reason, when the strain gauge manufactured to design does not have the design electrical resistance, and the trim resistors are trimmed to adjust the electrical resistance of the zigzag resistor pattern, the electrical resistance is adjusted in steps of the constant electrical resistance. As a result, it is difficult to accurately adjust the electrical resistance of the strain gauge.

SUMMARY OF THE INVENTION

Accordingly, it is an object in one aspect of the embodiments to provide a strain gauge having an electrical resistance that is accurately adjustable.

According to one aspect of the embodiments, a strain gauge includes a substrate having a surface; a resistor pattern, provided on the surface of the substrate, having a pair of terminals, and a plurality of grid lines coupled to each other in series and forming a zigzag pattern coupled between the pair of terminals; and at least one adjusting part provided on the zigzag pattern, wherein the at least one adjusting part includes a plurality of trim resistors coupled in parallel to one of the plurality of the grid lines, and wherein the plurality of trim resistors are arranged at intervals along a direction in which the one of the plurality of grid lines of the zigzag pattern extends, and have mutually different lengths along the one of the plurality of grid lines of the zigzag pattern.

Other objects and further features of the present invention will be apparent from the following detailed description when read in conjunction with the accompanying drawings.

DESCRIPTION OF THE PREFERRED EMBODIMENTS

Figure 1:
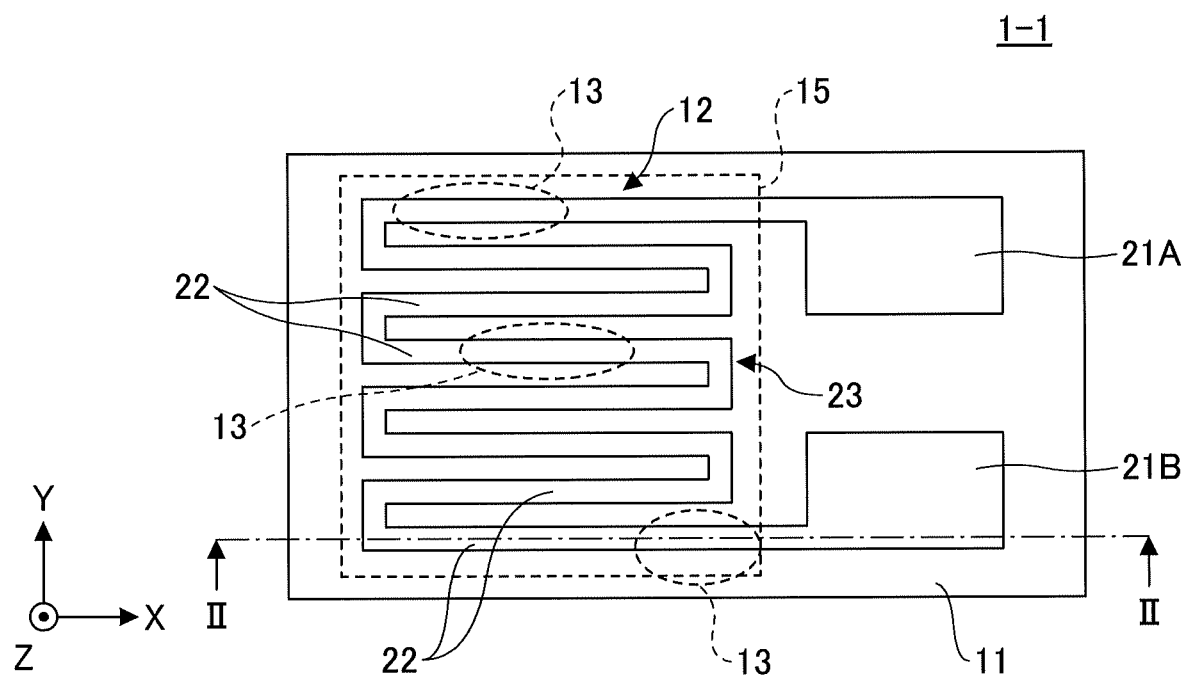
FIG. 1 is a plan view schematically illustrating an example of a strain gauge in a first embodiment of the present invention.

A description will be given of embodiments of the strain gauge according to the present invention, by referring to the drawings.

Figure 2:
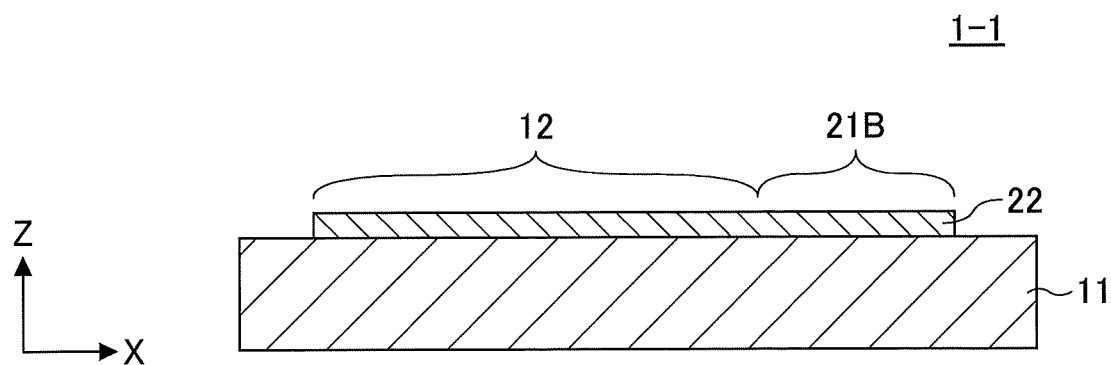
FIG. 2 is a cross sectional view schematically illustrating the example of the strain gauge in the first embodiment of the present invention along a line II-II in FIG. 1.

FIG. 1 is a plan view schematically illustrating an example of a strain gauge in a first embodiment of the present invention, and FIG. 2 is a cross sectional view schematically illustrating the example of the strain gauge in the first embodiment of the present invention along a line II-II in FIG. 1. FIG. 1 and FIG. 2 illustrate schematic views in which elements of the strain gauge are not drawn to scale.

Figure 3:
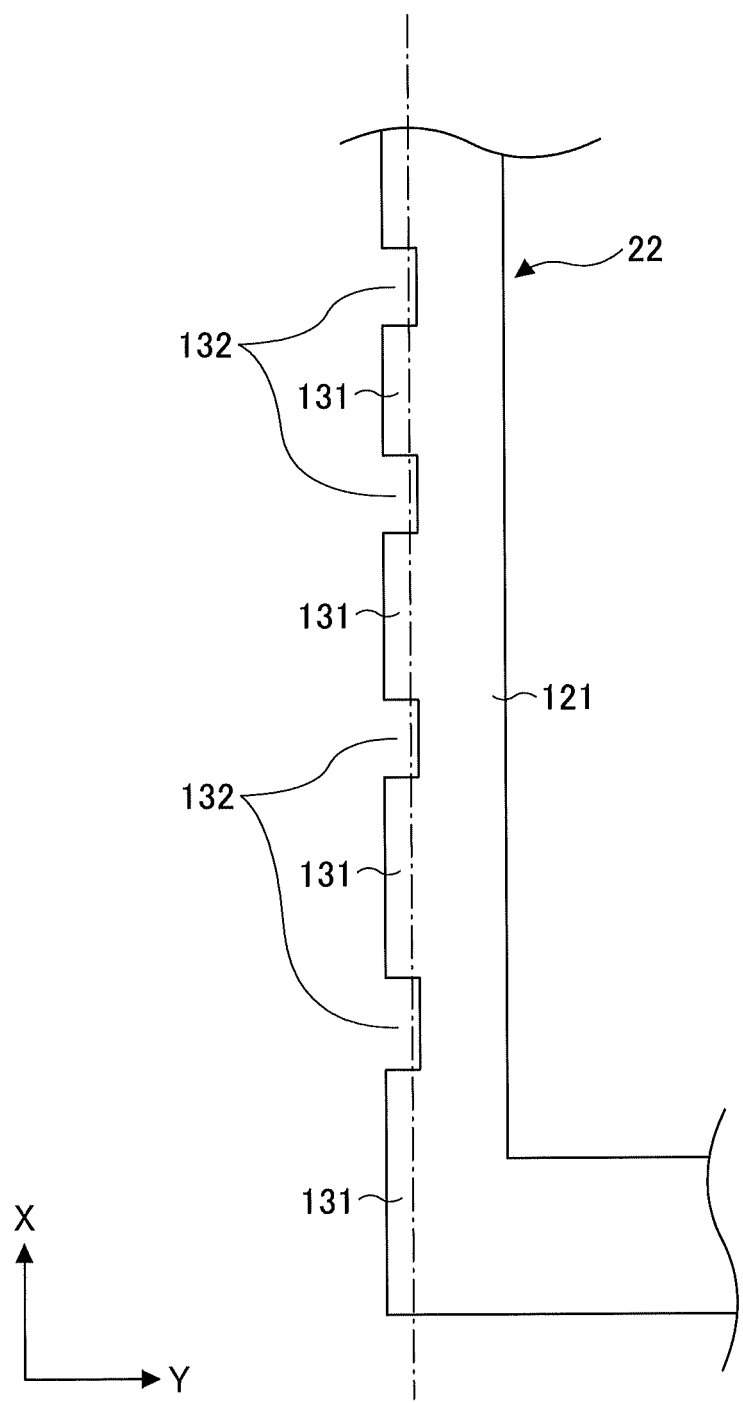
FIG. 3 is a plan view illustrating a first example of an adjusting part of the strain gauge.
Figure 4:
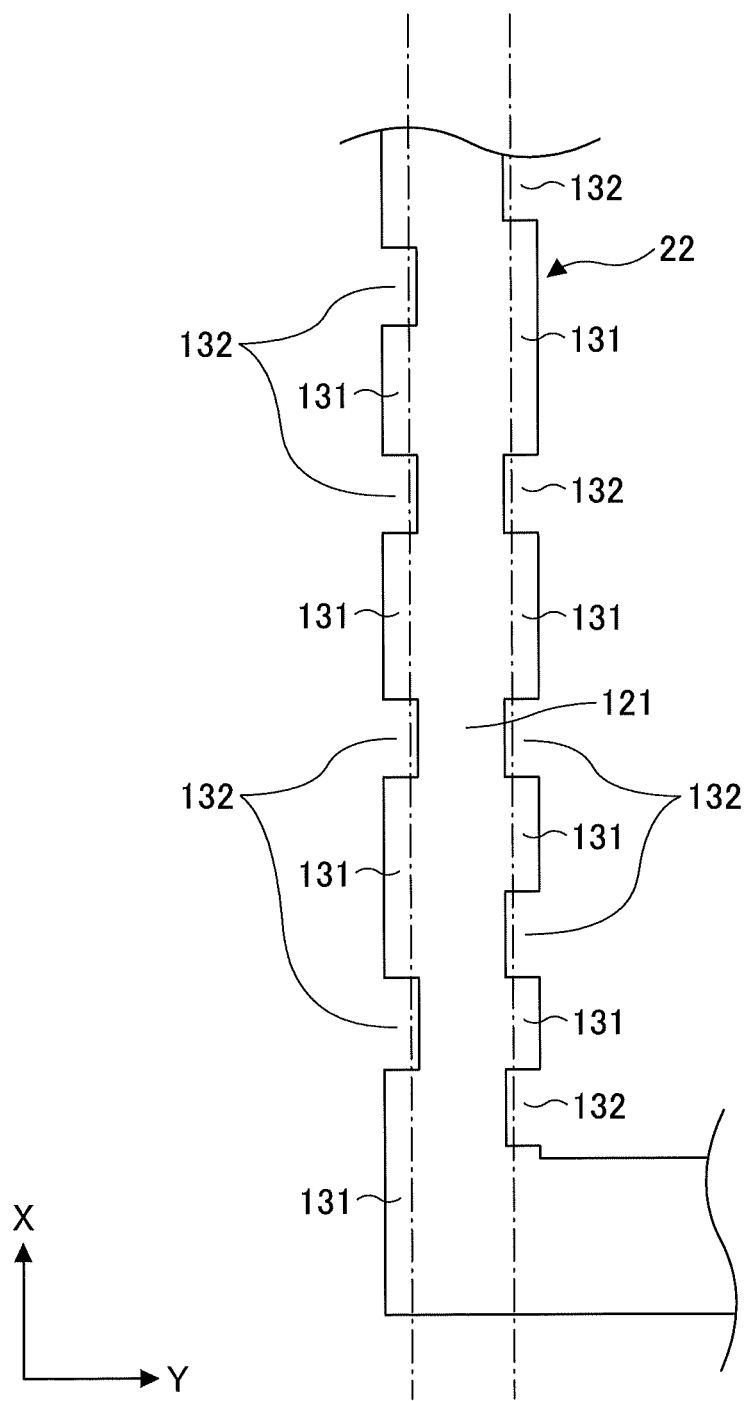
FIG. 4 is a plan view illustrating a second example of the adjusting part of the strain gauge.

As illustrated in FIG. 1, a strain gauge 1-1 includes a substrate 11, a resistor pattern 12, and one or more adjusting parts 13. FIG. 1 illustrates an example in which three adjusting parts 13 are provided. In FIG. 1, locations of the adjusting parts 13 are encircled by dotted lines for the sake of convenience, and examples of actual configurations of the adjusting parts 13 are illustrated in FIG. 3 and FIG. 4 which will be described later.

The substrate 11 is made of a flexible insulator material, and has an upper surface and a lower surface as illustrated in FIG. 2. The substrate 11 may be formed by a film of the flexible insulator material selected from a group consisting of polyimide resins, epoxy resins, polyether ether ketone resins, polyethylene naphthalate resins, polyethylene terephthalate resins, polyphenylene sulfide resins, and polyolefin resins.

The resistor pattern 12 is provided on the upper surface of the substrate 11. The resistor pattern 12 is made of a metal or a metal alloy. The resistor pattern 12 may be made of a metal or a metal alloy selected from a group consisting of chromium, nickel, chromium alloys, nickel alloys, and nickel-chromium alloys. The metal or the metal alloy forming the resistor pattern 12 may have a thickness, taken along a direction Z, in a range of 0.05 μm to 2 μm.

The resistor pattern 12 has a pair of terminals 21A and 21B, and a plurality of grid lines 22 forming a zigzag pattern 23 coupled between the pair of terminals 21A and 21B. The plurality of grid lines 22 form a plurality of grid resistors 121 that are coupled to each other in series. FIG. 1 illustrates an example in which eight grid resistors 121 are coupled to each other in series, however, the number of grid resistors 121 may be other than eight and more than three. The zigzag pattern 23 includes parts extending in a direction X, and parts extending in a direction Y. The one or more adjusting parts 13 are provided on the zigzag pattern 23.

For example, the adjusting part 13 may be located at an outermost part of the zigzag pattern 23, along one grid line 22 of the zigzag pattern 23, extending along the direction X. The adjusting part 13 illustrated at a top location in FIG. 1 corresponds to the adjusting part 13 located at an example of such a location at the outermost part of the zigzag pattern 23.

In addition, the adjusting part 13 may be located at an inner part of the zigzag pattern 23 in the direction Y, along one grid line 22 of the zigzag pattern 23, extending along the direction X. The adjusting part 13 illustrated at a middle location in FIG. 1 corresponds to the adjusting part 13 located at an example of such a location at the inner part of the zigzag pattern 23.

Further, the adjusting part 13 may be located at an adjacent part of the zigzag pattern 23 adjacent to one of the pair of terminals 21A and 21B, along one grid line 22 of the zigzag pattern 23, extending along the direction X, but excluding locations of the pair of terminals 21A and 21B. The adjusting part 13 illustrated at a bottom location in FIG.

1 corresponds to the adjusting part 13 located at an example of such a location at the adjacent part of the zigzag pattern 23.

The resistor pattern 12 and the adjusting parts 13 in the plan view of FIG. 1, respectively viewed from above the upper surface of the substrate 11 in the direction Z perpendicular to the upper surface of the substrate 11, are arranged inside a strain sensing area 15 illustrated in FIG. 1. Accordingly, it is possible to avoid a surface area of the strain gauge 1-1 on a XY-plane from increasing due to the provision of the one or more adjusting parts 13.

Of course, the one or more adjusting parts 13 may be provided on the zigzag pattern 23 at locations other than the locations illustrated in FIG. 1, inside the strain sensing area 15.

FIG. 3 is a plan view illustrating a first example of the adjusting part of the strain gauge. The adjusting part 13 illustrated in FIG. 3 is provided along one side of one grid line 22 of the zigzag pattern 23, extending along the direction X. Although the adjusting part 13 is provided along the left side of the grid line 22 in FIG. 3, the adjusting part 13 may of course be provided along the right side of the grid line 22 in FIG. 3.

The adjusting part 13 illustrated in FIG. 3 includes a plurality of trim resistors 131 coupled in parallel to the grid resistor 121 formed by the grid line 22. Only four trim resistors 131 are completely visible in FIG. 3, however, the number of trim resistors 131 may be other than four and more than two.

Each of the trim resistors 131 is coupled in parallel to the grid resistor 121. The trim resistors 131 are arranged at intervals along a direction in which a grid line 22 of the zigzag pattern 23 extends. In this example, the trim resistors 131 are arranged at constant intervals along the direction X. However, the trim resistors 131 may be arranged at approximately the same intervals along the direction X, or at different intervals along the direction X.

The trim resistors 131 are configured to discretely adjust the electrical resistance of the resistor pattern 12. Each of the trim resistors 131 is trimmable to discretely adjust the electrical resistance of the resistor pattern 12.

The grid resistors 121 may have a uniform line width within the zigzag pattern 23. The trim resistors 131 may have a uniform line width along the direction Y. In this example, the uniform line width of the trim resistors 131 is different from the uniform line width of the grid resistors 121. However, the uniform line width of the trim resistors 131 may be the same as the uniform line width of the grid resistors 121. The trim resistors 131 have mutually different electrical resistances. The trim resistors 131 may be made of the same metal or metal alloy forming the resistor pattern 12.

The trim resistors 131 of the adjusting part 13 are separated by cutouts (or notches) 132 that extend along the grid line 22 of the zigzag pattern 23, extending along the direction X. In this example, the cutouts 132 have the same length along the direction X. The lengths of the trim resistors 131 along the direction X in which the grid line 22 of the zigzag pattern 23 extends may be determined by a predetermined mathematical function.

FIG. 3 illustrates an example in which the lengths of the trim resistors 131 consecutively decrease in the direction X. However, the lengths of the trim resistors 131 do not need to consecutively decrease in the direction X, and the trim resistors 131 having the different lengths may be arranged at random along the direction X.

FIG. 4 is a plan view illustrating a second example of the adjusting part of the strain gauge. In FIG. 4, those parts that are the same as those corresponding parts in FIG. 3 are designated by the same reference numerals, and a description thereof will be omitted. The adjusting part 13 illustrated in FIG. 4 is provided along both sides of the grid line 22 of the zigzag pattern 23.

FIG. 4 illustrates an example in which the lengths of the trim resistors 131 consecutively decrease in the direction X. In addition, the lengths of the trim resistors 131 provided on the left side of the grid line 22 consecutively increase in a downward direction in FIG. 4, while the lengths of the trim resistors 131 provided on the right side of the grid line 22 consecutively increase in an upward direction in FIG. 4. However, the lengths of the grid lines 131 on both sides of the grid line 22 do not need to consecutively increase or decrease in opposite directions. Further, the trim resistors 131 having the different lengths may be arranged at random along the direction X, on both sides of the grid line 22, or on at least one side of the grid line 22.

The trim resistors 131 provided along one side of the grid line 22 in FIG. 3 or FIG. 4 may respectively have electrical resistances such that an electrical resistance of the resistor pattern 12 is variably adjustable by trimming at least one of the trim resistors 131 of the adjusting part 13. By arranging the trim resistors 131 having mutually different lengths along the direction X in which the grid line 22 of the zigzag pattern 23 extends, it is possible to finely adjust the electrical resistance of the resistor pattern 12 in variable steps of the electrical resistance, according to the different electrical resistances of the trim resistors 131 that are trimmed.

The trim resistors 131 are configured to discretely adjust the electrical resistance of the resistor pattern 12 while maintaining the strain sensing area 15.

Each of the trim resistors 131 has a trimmable region configured to receive laser beam irradiation, when adjusting the electrical resistance of the resistor pattern 12 by laser trimming to trim at least one of the trim resistors 131. The trimmable region of the trim resistor 131 is a region of the trim resistor 131 extending along the direction X between two mutually adjacent cutouts 132. The trimmable region of the trim resistor 131 at one end of the zigzag pattern 23 (for example, at left end of the adjusting part 13 illustrated at the top location in FIG. 3 or FIG. 4) is a region of the trim resistor 131 extending along the direction X adjacent to one adjacent cutout 132. The trimmable regions of the trim resistors 131 may extend along the direction X as indicated by a one-dot chain line in FIG. 3 or FIG. 4, along the side of the grid line 22. The trimmable regions of the trim resistors 131, indicated by the one-dot chain line, may match or substantially match the side (or side edge) of the grid line 22.

Figure 5:
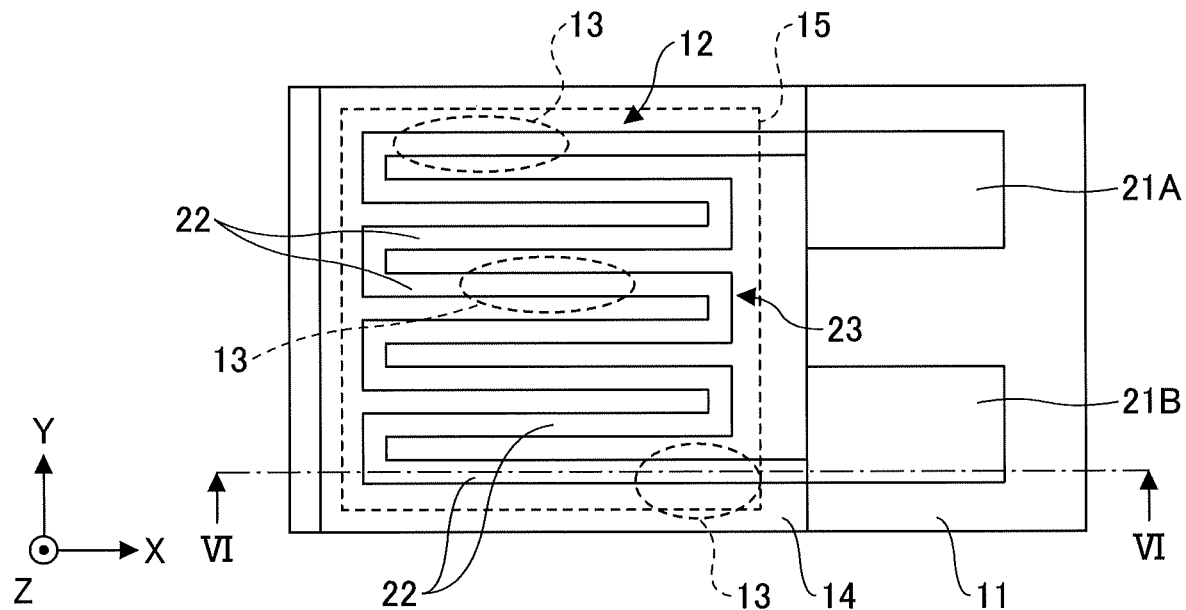
FIG. 5 is a plan view schematically illustrating an example of the strain gauge in a second embodiment of the present invention.
Figure 6:
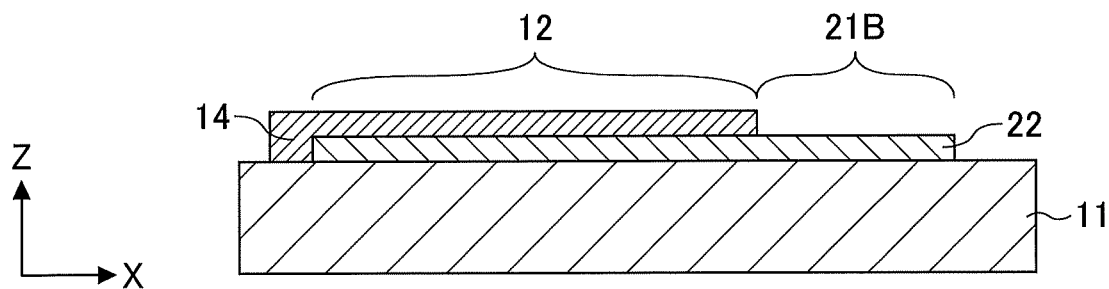
FIG. 6 is a cross sectional view schematically illustrating the example of the strain gauge in the second embodiment of the present invention along a line VI-VI in FIG. 5.

FIG. 5 is a plan view schematically illustrating an example of the strain gauge in a second embodiment of the present invention, and FIG. 6 is a cross sectional view schematically illustrating the example of the strain gauge in the second embodiment of the present invention along a line VI-VI in FIG. 5. In FIG. 5 and FIG. 6, those parts that are the same as those corresponding parts in FIG. 1 and FIG. 2 are designated by the same reference numerals, and a description thereof will be omitted.

A strain gauge 1-2 illustrated in FIG. 5 and FIG. 6 includes a protection layer 14 that protects the resistor pattern 12. The protection layer 14 is made of an insulator material. The protection layer 14 covers the resistor pattern 12, but exposes the pair of terminals 21A and 21B and each adjusting part 13.

The protection layer 14 may be made of the insulator material selected from a group consisting of polyimide resins, epoxy resins, polyether ether ketone resins, polyethylene naphthalate resins, polyethylene terephthalate resins, polyphenylene sulfide resins, and polyolefin resins. The protection layer 14 may be made of the insulator material that is appropriately selected so as not to deteriorate the flexibility of the substrate 1. For example, the protection layer 14 may have a thickness in a range of 2 μm to 30 μm.

In each of the embodiments described above, the adjusting part 13 is arranged along at least one side of the grid line 22, along a portion of the grid line 22. However, the adjusting part 13 may be arranged along at least one side of the grid line 22, along the entire length the grid line 22, but excluding the locations of the pair of terminals 21A and 21B.

In addition, in each of the embodiments described above, the trim resistors 131 of the same adjusting part 13 have mutually different resistances, or mutually different lengths along the direction X. However, the adjusting part 13 may include at least two trim resistors 131 having the same resistances, or the same length along the direction X, in addition to the trim resistors 131 having the mutually different resistances, or the mutually different lengths along the direction X.

According to each of the embodiments described above, when the strain gauge 1-1 or 1-2 manufactured to design does not have the design electrical resistance, and one or more trim resistors 131 are trimmed to adjust the electrical resistance of the zigzag pattern 23, the electrical resistance can be adjusted in fine variable steps of the electrical resistance because the trim resistors 131 have mutually different electrical resistances along the direction X in which the grid line 22 of the zigzag pattern 23 extends. As a result, it is possible to accurately adjust the electrical resistance of the strain gauge 1-1 or 1-2. In other words, according to each of the embodiments described above, it is possible to provide a strain gauge 1-1 or 1-2 having an electrical resistance that is accurately adjustable.

In addition, when two or more adjacent trim resistors 131 of the same adjusting part 13 are trimmed by the laser trimming, a takt time can be reduced because the laser trimming can efficiently remove the two or more adjacent trim resistors 131. For example, the laser trimming can remove the two or more adjacent trim resistors 131 in one linear sweep or scan of a laser beam, along one side of the grid line 22 of the zigzag pattern 23, for example. In a case in which the lengths of the trim resistors 131 consecutively decrease in the direction X, for example, the laser beam may continuously trim the trim resistors 131 in a decreasing order of the lengths of the trim resistors 131. In this case, it is possible to finely adjust the electrical resistance of the resistor pattern 12 by an amount that successively decreases according to the number of trim resistors 131 that are trimmed and finally removed.

Of course, the order in which each of the trim resistors 131 of the same adjusting part 13 are trimmed by the laser trimming does not need to be dependent on the increasing or decreasing order of the lengths of the trim resistors 131.

Further, according to each of the embodiments described above, the resistor pattern 12 and the adjusting part 13 in the plan view, respectively viewed from above the substrate surface in the direction Z perpendicular to the substrate surface, are arranged inside the strain sensing area 15. Further, the trim resistors 131 are configured to discretely adjust the electrical resistance of the resistor pattern 12 while maintaining the strain sensing area 15. Consequently, it is possible to provide a strain gauge 1-1 or 1-2 having an electrical resistance that is accurately adjustable, without increasing the size of the strain gauge 1-1 or 1-2.

Although the embodiments are numbered with, for example, "first," "second," etc., the ordinal numbers do not imply priorities of the embodiments.

Further, the present invention is not limited to these embodiments, but various variations and modifications may be made without departing from the scope of the present invention.

What is claimed is:

1. A strain gauge comprising:
a substrate having a surface;
a resistor pattern, provided on the surface of the substrate, having a pair of terminals, and a plurality of grid lines coupled to each other in series and forming a zigzag pattern coupled between the pair of terminals; and
at least one adjusting part provided on the zigzag pattern, wherein the at least one adjusting part includes a plurality of trim resistors coupled in parallel to one of the plurality of the grid lines, and
wherein the plurality of trim resistors are arranged at intervals along a direction in which the one of the plurality of grid lines of the zigzag pattern extends, and have mutually different lengths along the one of the plurality of grid lines of the zigzag pattern.

2. The strain gauge as claimed in claim 1, wherein the plurality of trim resistors of the at least one adjusting part are separated by cutouts that extend along the one of the plurality of grid lines of the zigzag pattern.

3. The strain gauge as claimed in claim 1, wherein the at least one adjusting part is located at an outermost part of the zigzag pattern.

4. The strain gauge as claimed in claim 1, wherein the at least one adjusting part is located at an inner part of the zigzag pattern, excluding an outermost part of the zigzag pattern.

5. The strain gauge as claimed in claim 1, wherein the at least one adjusting part is provided along one side of the one of the plurality of grid lines of the zigzag pattern.

6. The strain gauge as claimed in claim 1, wherein the at least one adjusting part is provided along both sides of the one of the plurality of grid lines of the zigzag pattern.

7. The strain gauge as claimed in claim 1, wherein the plurality of trim resistors have mutually different electrical resistances that decrease in one direction along the one of the plurality of grid lines of the zigzag pattern.

8. The strain gauge as claimed in claim 1, wherein the substrate is made of a flexible insulator material, and the resistor pattern is made of a metal or a metal alloy.

9. The strain gauge as claimed in claim 8, wherein the substrate is formed by a film of the flexible insulator material selected from a group consisting of polyimide resins, epoxy resins, polyether ether ketone resins, polyethylene naphthalate resins, polyethylene terephthalate resins, polyphenylene sulfide resins, and polyolefin resins.

10. The strain gauge as claimed in claim 8, wherein the resistor pattern is made of the metal or the metal alloy selected from a group consisting of chromium, nickel, chromium alloys, nickel alloys, and nickel-chromium alloys.

11. The strain gauge as claimed in claim 8, wherein the metal or the metal alloy forming the resistor pattern has a thickness in a range of 0.05 μm to 2 μm.

12. The strain gauge as claimed in claim 8, wherein the plurality of trim resistors are made of the metal or the metal alloy forming the resistor pattern, and have a uniform line width.

13. The strain gauge as claimed in claim 8, wherein the plurality of grid lines have a uniform line width.

14. The strain gauge as claimed in claim 1, further comprising:
 a protection layer, made of an insulator material, covering the resistor pattern and exposing the pair of terminals and the at least one adjusting part.

15. The strain gauge as claimed in claim 1, wherein the plurality of trim resistors respectively have electrical resistances such that an electrical resistance of the resistor pattern is variably adjustable by trimming at least one of the plurality of trim resistors of the at least one adjusting part.

16. The strain gauge as claimed in claim 1, wherein the plurality of trim resistors are configured to discretely adjust an electrical resistance of the resistor pattern.

17. The strain gauge as claimed in claim 1, wherein the plurality of trim resistors are trimmable to discretely adjust an electrical resistance of the resistor pattern.

18. The strain gauge as claimed in claim 1, wherein
 the resistor pattern and the at least one adjusting part in a plan view, respectively viewed from above the surface of the substrate in a direction perpendicular to the surface of the substrate, are arranged inside a strain sensing area, and
 the plurality of trim resistors are configured to discretely adjust an electrical resistance of the resistor pattern while maintaining the strain sensing area.

19. The strain gauge as claimed in claim 1, wherein
 each of the plurality of trim resistors has a trimmable region configured to receive laser beam irradiation when adjusting an electrical resistance of the resistor pattern by laser trimming to trim at least one of the plurality of trim resistors, and
 the trimmable regions of the plurality of trim resistors extend linearly along at least one side of the one of the plurality of grid lines of the zigzag pattern.

20. The strain gauge as claimed in claim 19, wherein
 the lengths of the plurality of trim resistors consecutively decrease in one direction along the one of the plurality of grid lines of the zigzag pattern, and
 the electrical resistance of the resistor pattern is adjustable by an amount that successively decreases according to a number of trim resistors that are trimmed and finally removed by the laser trimming that continuously trims the number of trim resistors in a decreasing order of the lengths of the plurality of trim resistors.

* * * * *